US011268809B2

(12) United States Patent
Bennett et al.

(10) Patent No.: US 11,268,809 B2
(45) Date of Patent: Mar. 8, 2022

(54) DETECTING AND CORRECTING DEFICIENCIES IN SURFACE CONDITIONS FOR BONDING APPLICATIONS

(71) Applicant: International Business Machines Corporation, Armonk, NY (US)

(72) Inventors: Jennifer Bennett, Rochester, MN (US); James D. Bielick, Pine Island, MN (US); David J. Braun, St. Charles, MN (US); Timothy P. Younger, Rochester, MN (US); Theron L. Lewis, Rochester, MN (US); Stephen M. Hugo, Stewartville, MN (US); John R. Dangler, Rochester, MN (US); Timothy A. Bartsch, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 16/182,719

(22) Filed: Nov. 7, 2018

(65) Prior Publication Data

US 2020/0141726 A1 May 7, 2020

(51) Int. Cl.
*G01B 21/30* (2006.01)

(52) U.S. Cl.
CPC .................................. *G01B 21/30* (2013.01)

(58) Field of Classification Search
CPC .................................................. G01B 21/30
See application file for complete search history.

(56) References Cited

U.S. PATENT DOCUMENTS 3,160,752 A 12/1964 Bennett
3,850,526 A 11/1974 Corey, III
(Continued)

FOREIGN PATENT DOCUMENTS

WO WO-2014064319 A1 * 5/2014 ............ G01B 21/30

OTHER PUBLICATIONS

P. Mell et al., “The NIST Definition of Cloud Computing”, National Institute of Standards and Technology, Information Technology Laboratory, Sep. 2011, pp. 1-7.
S. Ban et al., “Acid Etching of Titaniun for Bonding With Veneering Composite Resins” Dental Materials Journal, 25(2), 2006, pp. 382-390.
S. Budhe et al. “Effect of Surface Roughness Using Different Adherend Materials on the Adhesive Bond Strength”, Springer, Applied Adhesion Science 3:20, 2015, pp. 1-10.
(Continued)

*Primary Examiner* — Matthew G Marini
(74) *Attorney, Agent, or Firm* — Law Office of Jim Boice

(57) ABSTRACT

A method adjusts a mechanical process on a material in order to improve bonding characteristics of the material. A system collects surface micro-roughness measurements of a material, and places discrete sampling regions on the material. The system analyzes the surface micro-roughness measurements for each of the discrete sampling regions on the material, and identifies a lowest micro-roughness measurement in a discrete sampling region from a plurality of discrete sampling regions on the material. The system compares the lowest micro-roughness measurement to a threshold micro-roughness measurement in order to determine that the lowest micro-roughness measurement is less than the threshold micro-roughness measurement. In response to determining that the lowest micro-roughness measurement is less than the threshold micro-roughness measurement, the system adjusts a mechanical process on the material until micro-roughness measurements for each of the discrete sampling regions are greater than the threshold micro-roughness measurement.

18 Claims, 12 Drawing Sheets

SYSTEM MEMORY 136
OPERATING SYSTEM 138
SHELL 140
KERNEL 142
APPLICATION PROGRAMS 144
BROWSER 146
MATERIAL MANUFACTURING CONTROL LOGIC (MMCL) 148
PROCESSOR 104
HARD DRIVE 134
HARD DRIVE INTERFACE 132
COMPUTER 102
SYSTEM BUS 106
BUS BRIDGE 112
VIDEO ADAPTER 108
I/O BUS 114
I/O INTERFACE 116
USB PORT(S) 126
NETWORK INTERFACE 130
ROUGHNESS MEASURING DEVICE 152
NETWORK 127
SOFTWARE DEPLOYING SERVER 150
MATERIAL PROCESSING DEVICE 154
DISPLAY 110
KEYBOARD 118
MOUSE 120
MEDIA TRAY 122

(56) References Cited

U.S. PATENT DOCUMENTS

| | | | | |
|---|---|---|---|---|
| 4,258,319 | A | 3/1981 | Shimada et al. | |
| 5,814,722 | A | 9/1998 | Pratt et al. | |
| 5,859,919 | A | 1/1999 | Holland et al. | |
| 6,288,451 | B1 | 9/2001 | Tsao | |
| 6,521,139 | B1 | 2/2003 | Kondo et al. | |
| 7,250,220 | B1 | 7/2007 | Rymer et al. | |
| 2003/0144761 | A1* | 7/2003 | Basson .................. | G01B 21/30 700/175 |
| 2004/0048486 | A1 | 3/2004 | Bernards et al. | |
| 2013/0133926 | A1 | 5/2013 | Kim et al. | |
| 2014/0256229 | A1 | 9/2014 | Zhang et al. | |
| 2016/0184893 | A1* | 6/2016 | Dave ...................... | B33Y 50/02 419/53 |
| 2016/0286653 | A1* | 9/2016 | Mori ...................... | H05K 3/105 |
| 2018/0171135 | A1* | 6/2018 | Kasahara ............... | C09J 179/04 |
| 2018/0286058 | A1* | 10/2018 | Vadakke Matham ... | G06T 7/194 |

OTHER PUBLICATIONS

International Organization for Standardization, "Geometrical Product Specifications (GPS)—Surface Texture: Profile Method—Terms, Definitions and Surface Texture Parameters", ISO 4287:1997(E/F), Switzerland, 1997, 34 Pages.

Keyence Corporation of America, "Keyence Color 3D Laser Scanning Microscope VK-8700/9700 Generation II", VK3IN1-KA-TG-E, 2010, pp. 1-12.

M. H. Khan et al., "Effect of Oxidation and Surface Roughness on the Shear Strength of Single-Lap-Joint Adhesively Bonded Metal Specimens by Tension Loading", Springer, Applied Adhesion Science 4:21, 2016, pp. 1-17.

N. Saleema et al., "A Simple Surface Treatment and Characterization of AA 6061 Aluminum Alloy Surface for Adhesive Bonding Applications" National Research Council of Canada, Applied Surface Science, vol. 261, Nov. 15, 2012, pp. 742-748.

* cited by examiner

703

| | Ra | |
|---|---|---|
| SEG.1-7 | 0.536 | µm |
| SEG.2-7 | 0.2 | µm |
| SEG.3-7 | 0.082 | µm |
| SEG.4-7 | 0.381 | µm |
| SEG.5-7 | 0.149 | µm |
| SEG.6-7 | 0.116 | µm |
| SEG.7-7 | 0.168 | µm |
| SEG.8-7 | 0.055 | µm min Ra |
| SEG.9-7 | 0.379 | µm |
| SEG.10-7 | 0.241 | µm |

800

20 MICRON BOXES

| | Ra | |
|---|---|---|
| SEG.1 | 0.473 | µm |
| SEG.2 | 0.26 | µm |
| SEG.3 | 0.172 | µm |
| SEG.4 | 0.287 | µm |
| SEG.5 | 0.193 | µm |
| SEG.6 | 0.173 | µm |
| SEG.7 | 0.168 | µm |
| SEG.8 | 0.133 | µm |
| SEG.9 | 0.264 | µm |
| SEG.10 | 0.279 | µm |
| MEAN | 0.2402 | |
| MEDIAN | 0.2265 | |
| MINIMUM | 0.133 | |

804

15 MICRON BOXES

| | Ra | |
|---|---|---|
| SEG.1 | 0.524 | µm |
| SEG.2 | 0.323 | µm |
| SEG.3 | 0.138 | µm |
| SEG.4 | 0.321 | µm |
| SEG.5 | 0.265 | µm |
| SEG.6 | 0.193 | µm |
| SEG.7 | 0.161 | µm |
| SEG.8 | 0.067 | µm |
| SEG.9 | 0.298 | µm |
| SEG.10 | 0.269 | µm |
| MEAN | 0.2559 | |
| MEDIAN | 0.267 | |
| MINIMUM | 0.067 | |

806

10 MICRON BOXES

| | Ra | |
|---|---|---|
| SEG.1 | 0.536 | µm |
| SEG.2 | 0.2 | µm |
| SEG.3 | 0.082 | µm |
| SEG.4 | 0.381 | µm |
| SEG.5 | 0.149 | µm |
| SEG.6 | 0.116 | µm |
| SEG.7 | 0.168 | µm |
| SEG.8 | 0.055 | µm |
| SEG.9 | 0.379 | µm |
| SEG.10 | 0.241 | µm |
| MEAN | 0.2307 | |
| MEDIAN | 0.184 | |
| MINIMUM | 0.055 | |

808

5 MICRON BOXES

| | Ra | |
|---|---|---|
| SEG.1 | 0.384 | µm |
| SEG.2 | 0.124 | µm |
| SEG.3 | 0.048 | µm |
| SEG.4 | 0.209 | µm |
| SEG.5 | 0.165 | µm |
| SEG.6 | 0.125 | µm |
| SEG.7 | 0.157 | µm |
| SEG.8 | 0.08 | µm |
| SEG.9 | 0.187 | µm |
| SEG.10 | 0.196 | µm |
| MEAN | 0.1675 | |
| MEDIAN | 0.161 | |
| MINIMUM | 0.048 | |

810

2 MICRON BOXES

| | Ra | |
|---|---|---|
| SEG.1 | 0.224 | µm |
| SEG.2 | 0.125 | µm |
| SEG.3 | 0.037 | µm |
| SEG.4 | 0.162 | µm |
| SEG.5 | 0.049 | µm |
| SEG.6 | 0.052 | µm |
| SEG.7 | 0.127 | µm |
| SEG.8 | 0.055 | µm |
| SEG.9 | 0.155 | µm |
| SEG.10 | 0.203 | µm |
| MEAN | 0.1189 | |
| MEDIAN | 0.126 | |
| MINIMUM | 0.037 | |

812

| FULL ROI | SELECT* ROI |
|---|---|
| | |
| | |
| | |
| | |
| | |
| | |
| | |
| | |
| | |
| | |
| 0.312 | 0.357 |
| | |
| | |

| HEATSINK BOND INTEGRITY CLASS | AVERAGE HS KNOCK-OFF STRENGTH (LB) | RESULTING PROCESS OR DESIGN ACTIONS | MICRO-ROUGHNESS - MinRa (microns) |
|---|---|---|---|
| [ 5 ] ROBUST HEATSINK DESIGN, NO ISSUES EXPECTED, WIDE PROCESS MARGIN | >24 | ROBUST HEATSINK - SUBSTANTIAL MARGIN, STANDARD HEATSINK PROCESS PARAMETERS ACCEPTABLE | >.05 |
| [ 4 ] ACCEPTABLE HEATSINK DESIGN. STRENGTH MARGIN IS SUFFICIENT TO AVOID DAMAGE IF CRITICAL VARIABLES ARE AT TARGET CONDITIONS. | 12 TO 24 | ACCEPTABLE HEATSINK WITH ENHANCED PROCESSES - ADEQUATE MARGIN FOR MOST APPLICATIONS, BUT NEED CRITICAL HEATSINK PROCESS PARAMETERS AT TARGET LEVELS, LONGER FIXTURE TIME, ENHANCED SURFACE CLEANING OF HEATSINK BASE | >.075 |
| [ 3 ] MARGINALLY ACCEPTABLE HEATSINK DESIGN. MAY HAVE ISSUES IF ASSEMBLY/HANDLING CONTACT IS EXPECTED | 9 TO 12 | MARGINALLY ACCEPTABLE HEATSINK - MAY BE ACCEPTABLE WITH ALL BEST PRACTICES / PROCESS CONTROLS AT ASSEMBLY PROCESSES, AND SUPPLEMENTAL CLEANING OF BOND SURFACE | >0.1 |
| [ 2 ] CRITICAL HEATSINK DESIGN. ISSUES LIKELY IF DIRECT CONTACT OCCURS IN ASSEMBLY AND HANDLING. RECOMMEND ALTERING DESIGN TO IMPROVE STRENGTH | 6 TO 9 | CRITICAL HEATSINK, NEED ALL BEST PRACTICES / HIGHEST QUALITY PROCESS CONTROLS. MAY HAVE ADEQUATE PERFORMANCE WITH IMPLEMENTATION OF BEST PRACTICES AT ALL ASSEMBLY PROCESSES | >0.1 |
| [ 1 ] DEFICIENT DESIGN, LIKELY TO HAVE MECHANICAL ISSUES WITH PRODUCT SHIPPING/HANDLING - NEED TO IMPROVE DESIGN | <6 | DEFICIENT DESIGN, RECOMMEND DESIGN CHANGE TO IMPROVE MARGIN. | |

FIG. 9

DETECTING AND CORRECTING DEFICIENCIES IN SURFACE CONDITIONS FOR BONDING APPLICATIONS

BACKGROUND

The present invention relates to the field of material science, and particularly to the field of bonding characteristics of materials. Still more particularly, the present invention relates to detecting deficiencies in materials that lead to bonding failures and correcting same.

SUMMARY

In an embodiment of the present invention, a method adjusts a mechanical process on a material in order to improve bonding characteristics of the material. A system collects surface micro-roughness measurements of a material, and places discrete sampling regions on the material. The system analyzes the surface micro-roughness measurements for each of the discrete sampling regions on the material, and identifies a lowest micro-roughness measurement in a discrete sampling region from a plurality of discrete sampling regions on the material. The system compares the lowest micro-roughness measurement to a threshold micro-roughness measurement in order to determine that the lowest micro-roughness measurement is less than the threshold micro-roughness measurement. In response to determining that the lowest micro-roughness measurement is less than the threshold micro-roughness measurement, the system adjusts a mechanical process on the material until micro-roughness measurements for each of the discrete sampling regions are greater than the threshold micro-roughness measurement.

In one or more embodiments, the method described herein is performed by an execution of a computer program product and/or a computer system.

BRIEF DESCRIPTION OF THE DRAWINGS

FIG. 8 illustrates a comparison of different sizes of discrete sampling regions used in one or more embodiments of the present invention;

FIG. 9 depicts exemplary bond integrity classes of a material that are created using one or more embodiments of the present invention;

DETAILED DESCRIPTION

Figure 1:
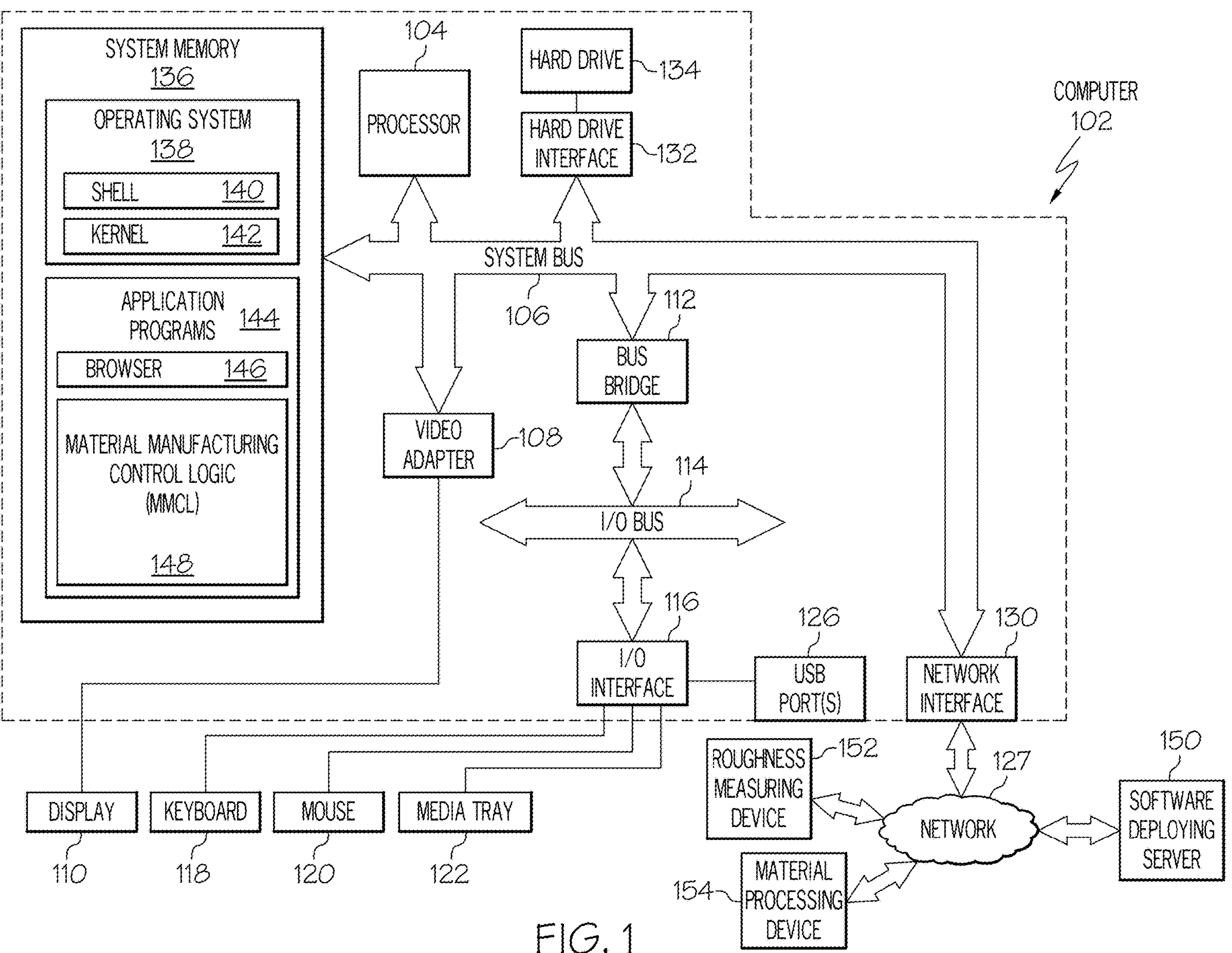
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or roughness measuring device 152 and/or material processing device 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, roughness measuring device 152, and/or material processing device 154 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Material Manufacturing Control Logic (MMCL) 148. MMCL 148 includes code for implementing the processes described below, including those described in FIGS. 2-10. In one embodiment, computer 102 is able to download MMCL 148 from software deploying server 150, including in an on-demand basis, wherein the code in MMCL 148 is not downloaded until needed for execution. Note further that, in one embodiment of the present invention, software deploying server 150 performs all of the functions associated with the present invention (including execution of MMCL 148), thus freeing computer 102 from having to use its own internal computing resources to execute MMCL 148.

Roughness measuring device 152 is a device that is able to measure and evaluate surface roughness of a material. (See FIGS. 5-6 and FIGS. 7-8 for additional exemplary details of the structure and operation of roughness measuring device 152.)

Material processing device 154 is a mechanical device that affects a surface roughness of a material. Examples of material processing device 154 include, but are not limited to: abrasive materials (which may be used manually—e.g., an abrasive pad that a user rubs against the material, or with a mechanical device—e.g., a mechanical sander); a plasma cleaner that uses high-energy plasma to clean a surface of the material, while also causing micro-etching on the surface of the material; a laser (which, like a plasma cleaner, cleans a surface of the material while also causing micro-etching on the surface of the material); a grit blaster (e.g., a micro sand blaster); etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Surface condition significantly affects bonding performance for material. That is, when an object is bonded (e.g., glued, pasted, fused, etc.), the effectiveness of the bonding depends on the surface condition of the material. If the surface condition is too smooth, then there is nothing for the bonding material (e.g., epoxy) to adhere to. If the surface condition is too rough, then the areas of contact between the two objects being bonded together are inadequate (due to valleys in the surfaces). Thus, there needs to be a certain amount of roughness that is neither too small (i.e., too smooth) or too large (i.e., too jagged).

A measurement of surface roughness used to describe surface roughness on material is a roughness average (Ra), which is an arithmetic average of peaks and valleys on a material surface. However, Ra does not provide a proper correlation with bond performance of a material, since Ra does not account for outlier peaks and valleys. That is, a Ra value of 50 micrometers merely states that the average peak-to-valley distance on the surface is 50 micrometers, but does not account for outlier peaks (e.g., 1000 micrometers high) and outlier valleys (e.g., 1000 micrometers deep), which will essentially cancel each other out in the Ra calculation, and yet will significantly affect the overall bonding ability of the material surface. Thus, micro-roughness measures small levels of surface irregularities, whereas Ra captures large scale surface variation.

Figure 2:
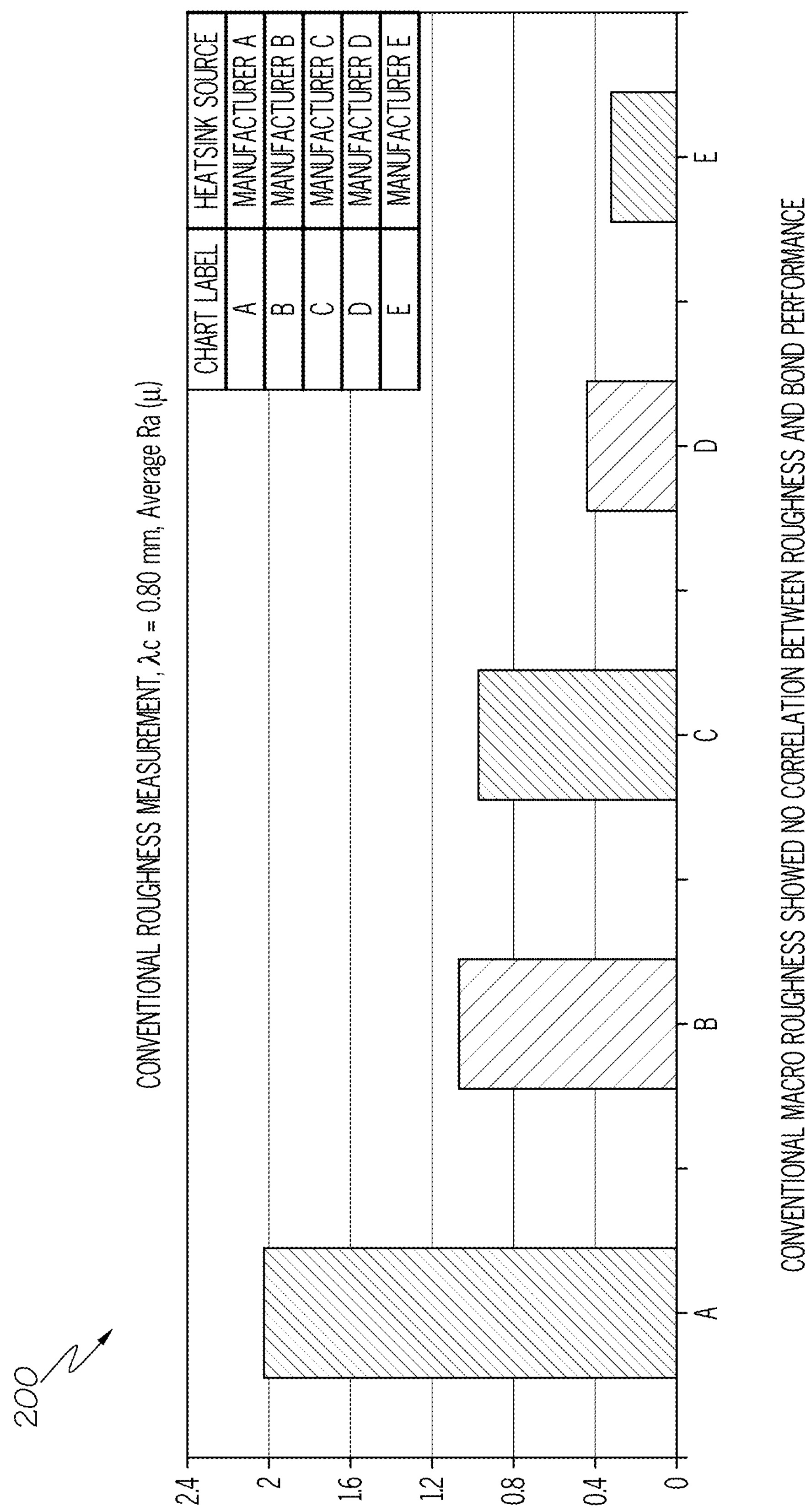
FIG. 2 illustrates a prior art failure of conventional roughness measurements to predict bond performance for a material sample.

For example, consider chart 200 shown in FIG. 2. As shown in chart 200, heatsinks A-E are different heatsinks that come from different manufacturers and have different surface roughness values Ra. As shown by the hash mark design in the bars for heatsinks A, C, and E, the heatsinks failed to bond properly. That is, assume that the heatsinks all have a base with slots, into which fins are bonded. With heatsinks A, C, and E, a high percentage of the fins failed to properly bond into the slots in the base, either at the time of delivery, or after being in use for a certain amount of time. However, the bonding of the fins to the slots in the base in heatsinks B and D held up within required limits, as indicated by the solid mark design of their bars. The issue, however, if that there is no correlation between how well the bonding held up and the Ra of the material. That is, the value of Ra for the surface roughness shows no correlation to how well the material (e.g., the fins) bonds (e.g., to the base) in the heatsinks.

Furthermore, heatsink bonding between (the bottom of) the heatsink base and (the top of) the module lid/chip that is attached to a printed circuit board (PCB) or raw card requires proper levels of surface roughness. This bonding of the heatsink to the module lid is essential for thermal performance of the heatsink.

Thus, conventional roughness measurements (Ra) do not ensure bond performance.

In order to address this problem, one or more embodiments of the present invention present a novel method to detect surface deficiencies for bonding applications using micro-roughness measurements, which correlate well with resulting bond integrity.

The present invention thus uses micro-roughness features to assess/predict adhesion characteristics of a surface. That is, the present invention differentiates between micro-roughness that affects bonding characteristics and coarser features/waviness that do not affect bond adhesion.

As such, one or more embodiments of the present invention utilize specific discrete sampling regions (e.g., 10 micron square regions), at high magnification (e.g., 50×-150×). These specific discrete sampling regions are then used to detect fine surface texture features beneficial to bond adhesion. The lowest roughness measurement of the group is defined as the minimum Ra (which is not the same as the coarse Ra described in FIG. 2), which represents a likely deficient region or flaw that can propagate to failure upon product shipping or operational stress.

In one or more embodiments of the present invention, the specific discrete sampling regions are optimized (i.e., their number, placement, etc.) using cognitive analytic tools based on adhesive, material type, and topography features.

That is, using historical data and/or an analysis of the material being bonded (e.g., ceramic fins being bonded to a ceramic base in a heat sink) and the type of bonding material being used (e.g., a thermal interface material (TIM), such as thermal grease, thermal adhesive, thermal tape, and other types of thermal conductive materials) is used to determine the number, position, etc. of the specific discrete sampling regions taken from the material being tested.

In one or more embodiments of the present invention, the process described herein is applied to a wide array of applications involving adhesive bonding to surfaces within all industries, including but not limited to: bonded heatsinks (e.g., bonding fins to the base of the heatsink); Thermal Interface Material (TIM) application (e.g., use of thermal paste to adhere a computer chip to a heat sink); wafer bonding and/or microelectromechanical system (MEMS) packaging; internal module lid bonding; Printed Circuit Board (PCB) laminate adhesion; etc. In any such application, the present invention is applicable for use with failure analysis techniques where surface deficiencies have created bond failure due to adhesive separation or process techniques for bonding/adhesion optimization.

In one or more embodiments, the present invention is used to evaluate bonding characteristics for coatings, plating, and paint surface preparation.

Thus, one or more embodiments of the present invention present a novel method to detect surface deficiencies, for which the present invention is effective in predicting/identifying faulty bonding characteristics on devices through numerous projects and designs of experiments.

Figure 3:
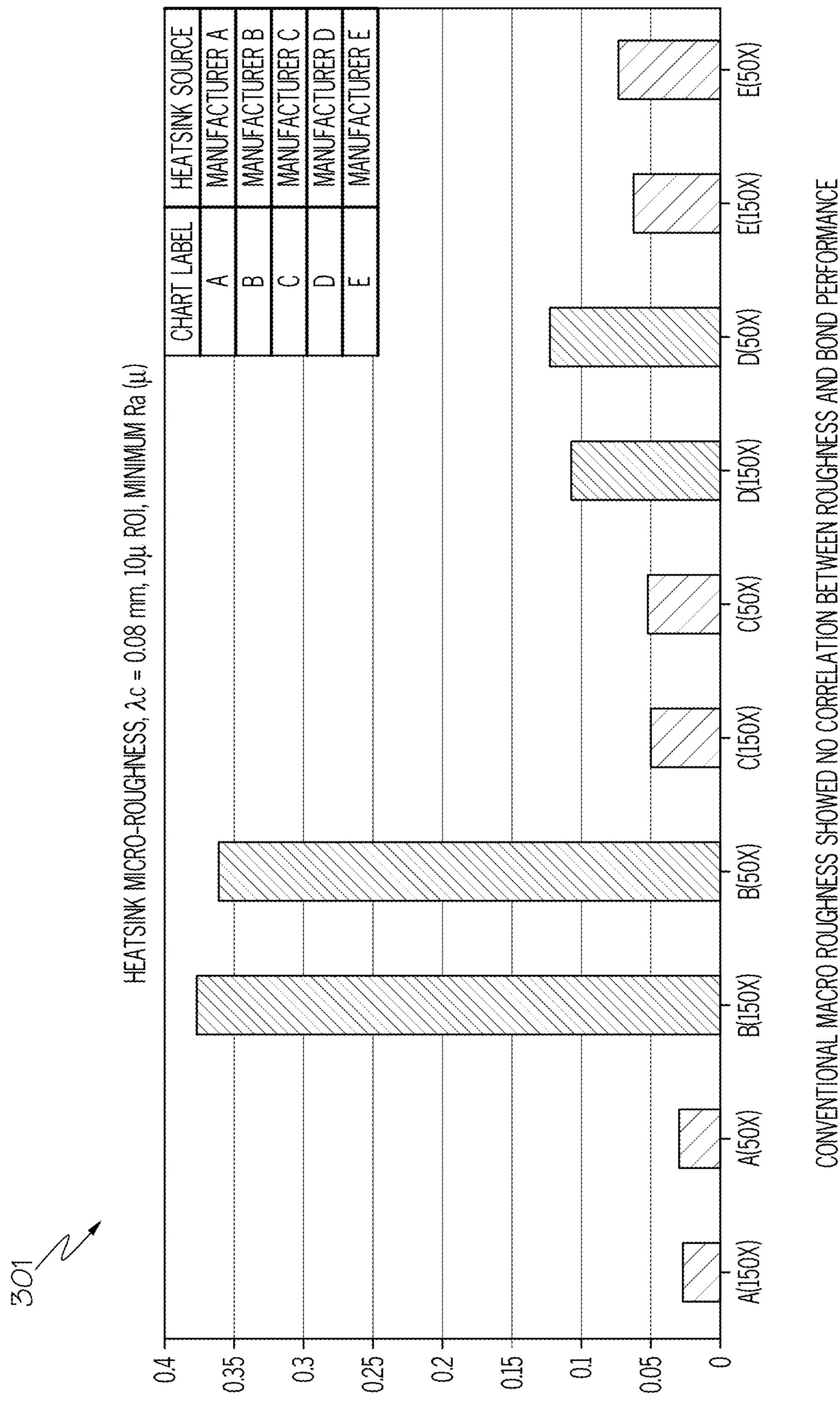
FIG. 3 depicts a success in predicting bond performance for the material sample shown in FIG. 2 through use of the present invention.

For example, as shown in chart 301 in FIG. 3, the same heatsinks A-E shown in FIG. 2 are shown to be accurately predicted to properly bond based on a minimum Ra. That is, rather than evaluate the coarse Ra (which looks at the overall roughness of the surface of the material), the present invention looks at small Regions of Interest (ROI) on the surface of the material (e.g., 10 micron squares). The minimum Ra from one of these ROIs is then determined. As such, any surface area whose ROIs show an Ra of at least 0.1 microns for the depicted application is deemed to show good bonding properties, such as those depicted in the bars for heatsink B and heatsink D (at both 150 times magnification and 50 times magnification).

However, the 10 micron ROIs for heatsinks A, C, and E show that these heatsinks have (or will have) bonding failures, since they all have 10 micron ROIs that are too smooth (having roughness values of less than 0.1 microns).

In order to measure surface roughness of material, various tools are used in various embodiments of the present invention, including but not limited to: atomic force microscopy, profilometer, Moiré fringe techniques, optical focus, scanning electron microscopy, etc.

Figure 4:
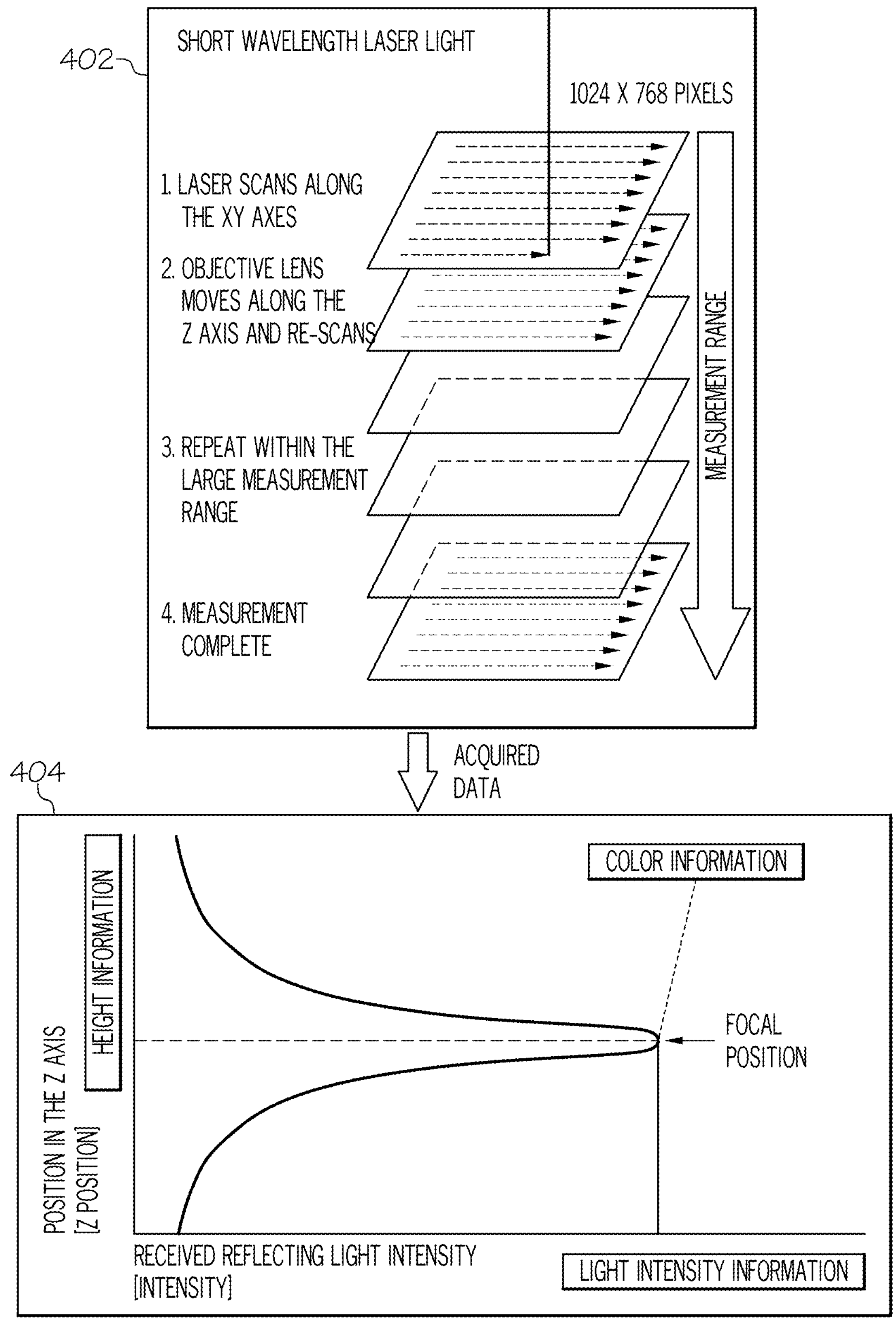
FIG. 4 illustrates an exemplary roughness measurement tool used in one or more embodiments of the present invention.

One such tool used to measure surface roughness of material at the microscopic level (in accordance with one or more embodiments of the present invention) is laser scanning microscopy, as shown in FIG. 4.

As shown in diagram 402, a laser scanning microscope uses two light sources (a short-wavelength laser source and a white light source) to capture the data needed to measure surface roughness. The laser and color images are necessary to capture a fully focused height and true color map.

As shown in step 1 in diagram 402, a laser light scans along the XY axes of the material. In step 2, an objective lens moves along the Z axis and the laser scanning microscope re-scans the material surface (in order to capture peaks and valleys in the surface). The process repeats in step 3 until the measurement range is reached (i.e., the desired surface area is scanned), and the process is complete (step 4). The acquired data is then charted, in order to detect each peak and valley on the material's surface, as shown for a particular focal point in diagram 404.

As defined herein, a course surface Roughness average (Ra) is the measure of surface irregularities in the surface texture. Ra, more specifically, defines the arithmetic average value of the roughness profile and the overall height variation of the surface valleys and peaks across the reference length, and uses the formula below as defined in ISO standard 4287:

$$R_a = \frac{1}{\ell r}\int_0^{\ell r} |f(x)|dx$$

Where $R_a$ is the roughness average, lr is the sample length (i.e., the region of interest being examined), f(x) is the roughness algorithm used for measuring roughness.

Micro-Roughness is similar to the coarse roughness defined in ISO standard 4287, in that it is also a measurement of surface roughness. However, micro-roughness is measured at a high magnification (typically between 50×-150×) to evaluate roughness on a micro scale.

Figure 5:
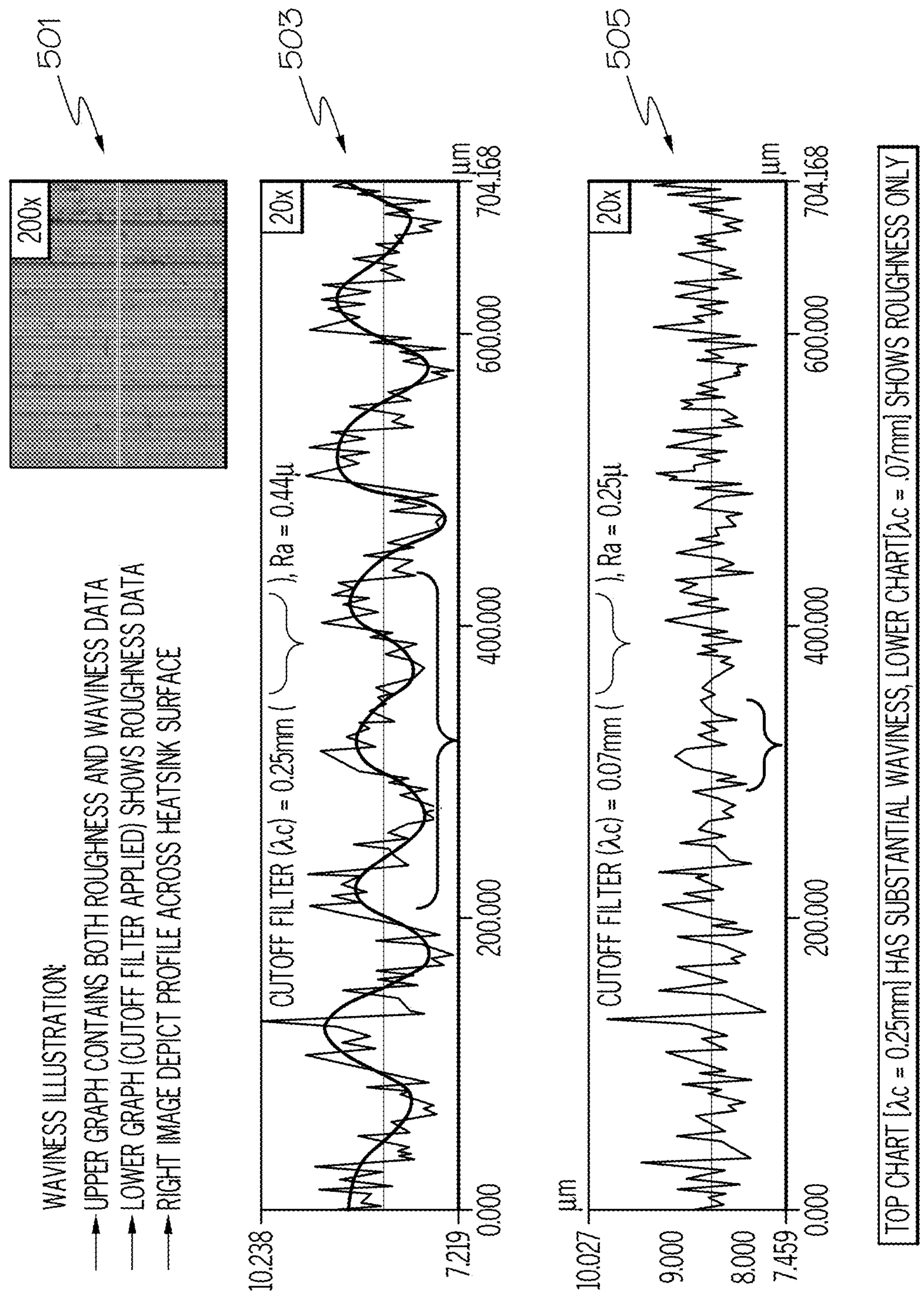
FIG. 5 depicts results of using a cutoff filter to separate surface waviness from surface roughness in accordance with one or more embodiments of the present invention.

With reference now to FIG. 5, a cutoff filter (λc) is a tool that is applied to separate surface waviness from surface roughness in one or more embodiments of the present invention.

As shown in block 501, a section of material has been magnified at 200×. When evaluated by a roughness scanning tool (e.g., see FIG. 4), a cutoff filter (λc) is applied to the measurements. For example, assume that the cutoff filter λc is set at 0.25 mm, as shown in graph 503. As seen in graph 503, this coarse cutoff filter (λc) allows the graph to include coarse variations in the surface, including waviness. However, if a finer cutoff filter (λc) is used (e.g., where λc is set at 0.7 mm), then the waviness is not captured (and thus is ignored), such that only fine roughness is depicted, as shown in graph 505. Thus, the cutoff filter (λc) allows the system to identify actual micro-roughness by removing waviness and other noise from the data.

Figure 6:
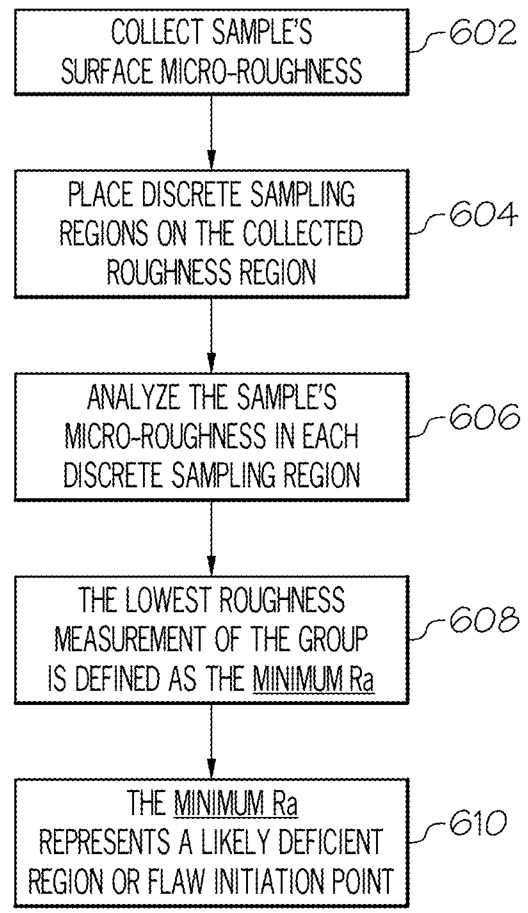
FIG. 6 illustrates a process for determining a minimum average roughness of a material in accordance with one or more embodiments of the present invention.

With reference now to FIG. 6, a high-level overview of one or more embodiments of the present invention is presented.

As shown in block 602, the process begins by collecting a sample's surface micro-roughness (e.g., at 50×-150× magnification). As described in block 604, discrete sampling regions are placed on the collected roughness region. (In an alternate embodiment, the discrete sampling regions are first placed on the sample's surface, and the micro-roughness readings are taken only from those discrete sampling regions.) In either embodiment, the discrete sampling regions are regions that cover only part of the surface area, as shown in detail below in FIG. 7.

In a preferred embodiment of the present invention, the size of the discrete sampling regions are 10 microns across. However, for finer granularity, the size of the discrete sampling regions is even smaller (e.g., 3-5 microns across).

The number (quantity of discrete sampling regions), scatter (placement of the discrete sampling regions), spacing (distance between the discrete sampling regions), and size (area of the discrete sampling regions) are optimally varied based on historical data (which shows how effective the process described herein is in predicting bonding failures) and/or material characteristics of the material and/or bonding material.

As shown in block 606 in FIG. 6, the sample's micro-roughness in each discrete sampling region is analyzed, with or without a cutoff filter (see FIG. 5). That is, the micro-roughness of each discrete sampling region is determined in block 606.

As shown in block 608, the lowest roughness measurement found in the group of discrete sampling regions is defined as the "minimum Ra", which represents the particular area on the material that is most likely to fail at bonding (block 610).

Figure 7:
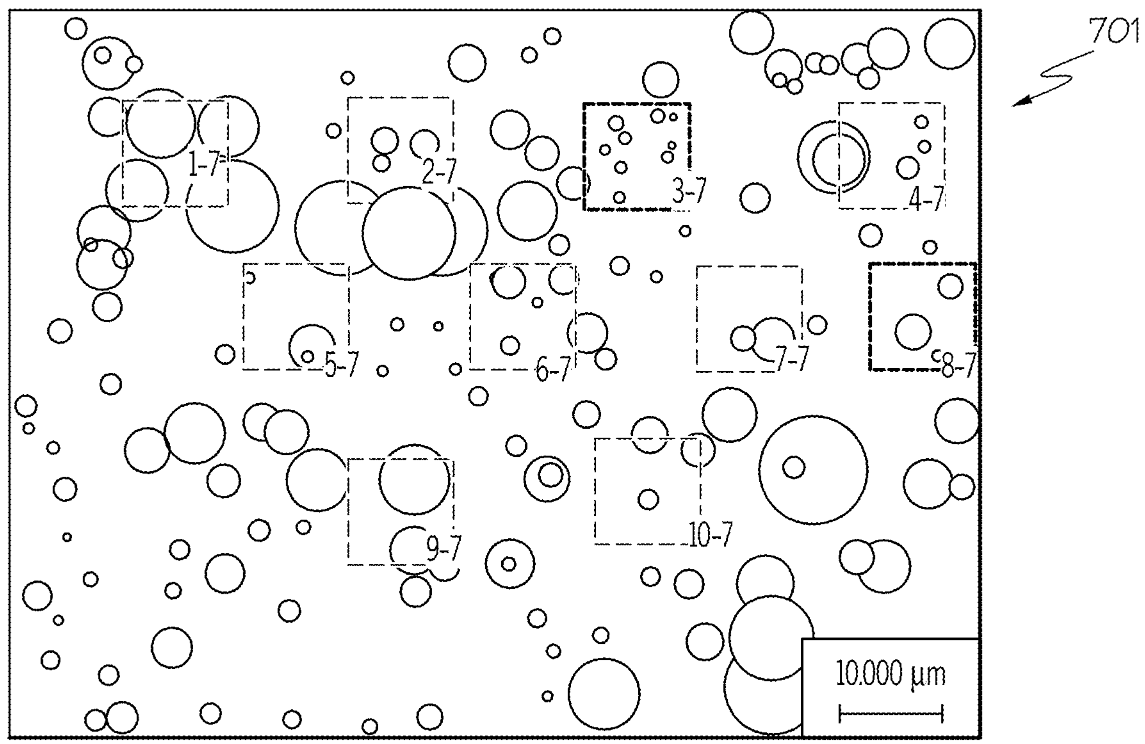
FIG. 7 depicts an exemplary result of the present invention in identifying a minimum average roughness in a particular discrete sampling region of a material sample.

With reference now to FIG. 7, photograph 701 (created using the laser scanning microscope shown in FIG. 4) represents a heatsink surface analyzed with the disclosed novel method. As shown in photograph 701, there are ten square discrete sampling regions, each having a 10 micron by 10 micron size, and labeled as segments 1-7 through 10-7.

As shown in chart 703, segment 8-7 yielded the lowest micro-roughness reading (0.055 microns of average roughness), which is defined as the "minimum Ra" for the sample shown in photograph 701. Thus, segment 8-7 represents a likely deficient region (flaw) which can propagate to failure on product shipping or operational stress.

With reference now to FIG. 8, a chart 800 shows how making a discrete sampling region enables the present invention to more accurately identify problem areas on material, which are too smooth, and thus do not adhere well. As shown in column 802, if no smaller discrete sampling regions are used, then the entire region is evaluated in order to determine the gross Ra (see FIG. 2), shown as 0.312 for a first full Region of Interest (ROI) or 0.357 for another ROI on the material surface.

As shown in column 804, if the discrete sampling regions are too large (e.g., 20 micron boxes), then none of the 20 micron boxes show an Ra that is less than 0.133. As such, the system detects no problems with the roughness of the material.

As shown in column 806, if the discrete sampling regions are a bit smaller (e.g., 15 micron boxes), then one of the 15 micron boxes show an Ra of 0.067, which is less than a minimum acceptable Ra (e.g., 0.10). As such, the system detects one segment ("Seg. 8") that is too smooth to properly bond to another material.

Thus, the minimum Ra, and likely defect region, is not appropriately defined when measuring the full region of interest (ROI), 20 micron, or 15 micron sampling regions.

However, as shown in column 808, if the discrete sampling regions are even smaller (e.g., 10 micron boxes), then two of the 10 micron boxes (Segment 8 as well as Segment 3) show an Ra that is problematic (too smooth to properly bond).

As shown in column 810, if the discrete sampling regions are even smaller (e.g., 5 micron boxes), then not only does Segment 8 continue to be shown as problematic, but Segment 3 is now identified as being even more of a problem (too smooth to properly bond), and is identified as having the new minimum Ra (0.0048).

As shown in column 812, if the discrete sampling regions are even smaller (e.g., 2 micron boxes), then not only do Segments 8 and 3 continue to be shown as problematic, but Segments 5 and 6 are now identified as being problem areas. However, Segment 3 is still the segment that has the minimum Ra (now 0.037).

Thus, once the heatsink (or other material) is scanned (see FIG. 4), all heatsink inspection data is uploaded into a cognitive system (e.g., an intelligent system such as a neural network or other deep learning system) to perform the following tasks described in FIG. 6, in order to determine size and placement of minimum Ra regions, perform the minimum Ra calculations on the corresponding regions, and to analyze the minimum Ra values to determine disposition of heatsink and risk of bond failure.

As discussed above, a threshold Ra is used to determine if a material is at risk of having inadequate bonding properties. As such, in one or more embodiments of the present invention an acceptable threshold Ra for heatsink micro-roughness (which is used to predict knock-off strength of the material/heatsink) is calculated per the following mechanical model formula:

$$P(\text{model}) = P(ref) * \frac{L(ref) * A(\text{model})}{L(\text{model}) * A(ref)}$$

where:

P(model)=Predicted Knock-off Strength (lbs) for modeled heatsink application

P(ref)=Knock-off Strength (lbs) for reference heatsink (=15 lbs)

L(ref)=Lever Arm at corner of reference heatsink (mm) (=31.23 mm)

L(model)=Lever Arm at corner of modeled heatsink (mm) (formula below)

A(ref)=Bond area of reference heatsink ($mm^2$) (=137.75 $mm^2$)

A(model)=Bond area of modeled heatsink ($mm^2$) (formula below)

L(model)=[Lever Arm] (mm) (formula below)

$$A(\text{model})=(L_T*W_T)$$

$L_T$=Tim Length (mm)

$W_T$=Tim Width (mm)

$$L(\text{model}) = \sqrt{H^2 + \sqrt{\left(\frac{L_{HS}}{2} + \Delta L_{HS}\right)^2 + \left(\frac{W_{HS}}{2} + \Delta W_{HS}\right)^2}}$$

H=Heatsink Height (mm)

$L_{HS}$=Heatsink Length (mm)

$W_{HS}$=Heatsink Width (mm)

$\Delta L_{HS}$=Heatsink placement offset in $L_{HS}$ orientation $\Delta W_{HS}$=Heatsink placement offset in $W_{HS}$ orientation Thus, an Average Heatsink Strength (e.g., 80% of P(model) value) determines an integrity class of heatsink, which drives progressively tighter micro-roughness for more critical bonds.

As shown in FIG. 9, an exemplary table 900 shows a correlation between knock off strength (as calculated by the formula for P(model) shown above) and minimum Ra values. That is, if the minimum Ra is greater than 0.05 but less than 0.075, then the bonding properties of the material are optimal. However, if the Ra is greater than 0.075 and/or 0.1, then the bonding properties of the material are potentially inadequate, since the true problem areas have not been identified (see FIG. 8) and corrective steps are taken to improve the bonding properties of the material.

Figure 10:
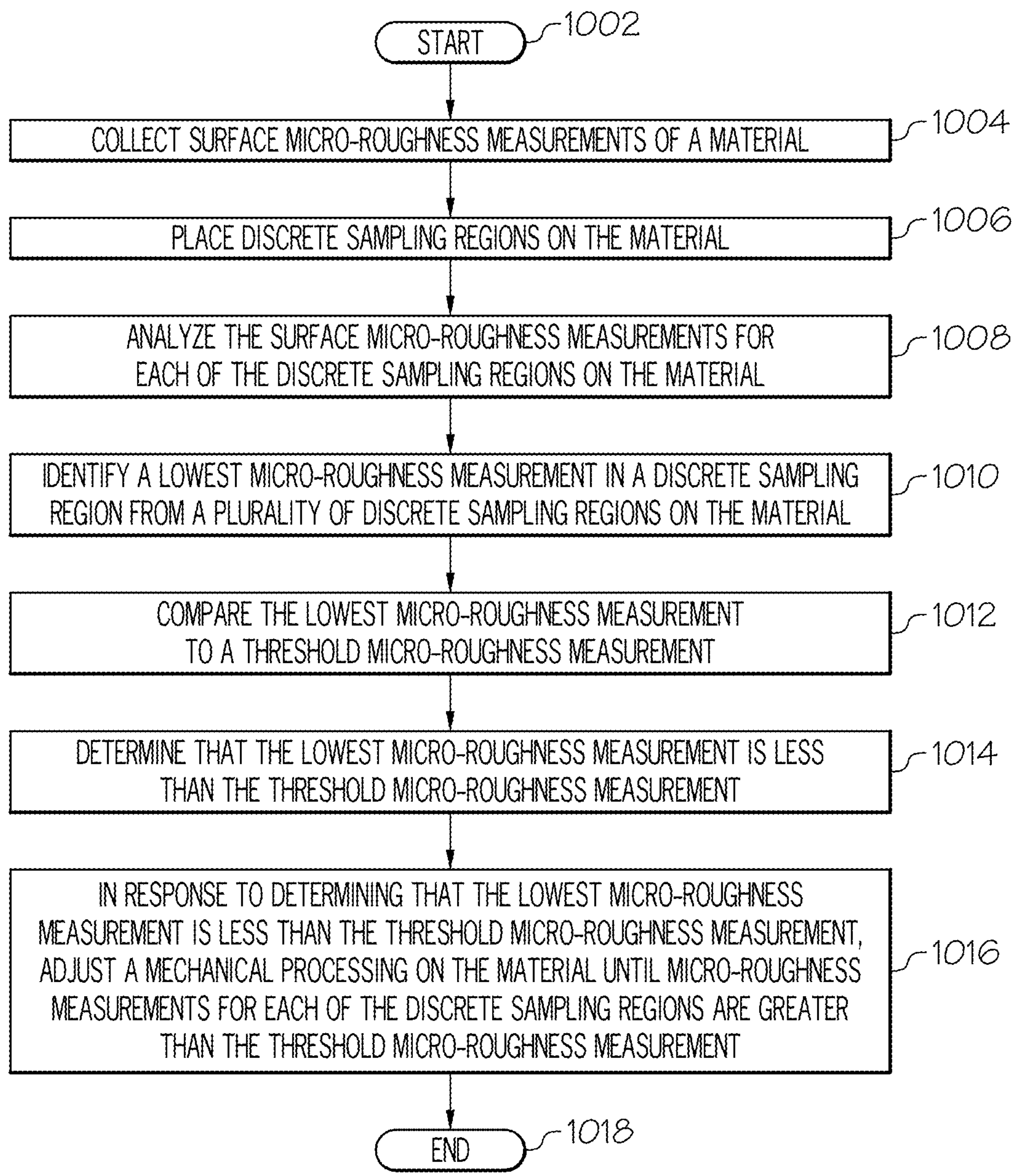
FIG. 10 is a high-level flow chart of one or more steps performed in accordance with one or more embodiments of the present invention.

With reference now to FIG. 10, a high-level flow-chart of one or more elements of the present invention is presented.

After initiator block 1002, a system (e.g., one or more processors from computer 102 shown in FIG. 1 or, alternatively, a human user) collects surface micro-roughness measurements of a material (e.g., from roughness measuring device 152, as described in FIG. 4), as described in block 1004.

As described in block 1006, the system places discrete sampling regions on the material (see FIG. 4). In an alternative embodiment, the discrete sampling regions are first defined and placed, and the surface micro-roughness measurements are then collected for the material.

As described in block 1008, the system analyzes the surface micro-roughness measurements for each of the discrete sampling regions on the material, and identifies a lowest micro-roughness measurement in a minimum discrete sampling region from the plurality of discrete regions on the material, as described in block 1010. (See FIGS. 7-8.)

As described in block 1012, the system compares the lowest micro-roughness measurement to a threshold micro-roughness measurement (e.g., using the P(model) described above), and determines that the lowest micro-roughness measurement is less than the threshold micro-roughness measurement, as described in block 1014 and detailed in FIGS. 8-9.

As described in block 1016, in response to determining that the lowest micro-roughness measurement is less than the threshold micro-roughness measurement, the system adjusts a mechanical process on the material until micro-roughness measurements for each of the discrete sampling regions are greater than the threshold micro-roughness measurement. For example and in various embodiments of the present invention, the mechanical process (that affects the roughness of the material) uses abrasive materials (which may be used manually—e.g., an abrasive pad that a user rubs against the material, or with a mechanical device—e.g., a mechanical sander); a plasma cleaner that uses high-energy plasma to clean a surface of the material, while also causing micro-etching on the surface of the material; a laser (which, like a plasma cleaner, cleans a surface of the material while also causing micro-etching on the surface of the material); a grit blaster (e.g., a micro sand blaster); etc. Such devices/equipment and/or the user thereof is adjusted until the micro-roughness measurements are within the tolerances defined by the mechanical model used in P(model).

The process ends at terminator block 1018.

In an embodiment of the present invention, the surface micro-roughness measurements of the material are collected using a magnification between 50× and 150× (see FIG. 3).

In an embodiment of the present invention, the threshold micro-roughness measurement is based upon a known failure roughness at which a bond has historically failed due to adhesive separation from the material. That is, the failure rate of bonding is based on historical data of knock-off strength as it correlates to the minimum Ra (see FIG. 9).

In an embodiment of the present invention, the system optimizes a quantity, scatter, spacing, and size of the discrete sampling regions based on physical characteristics of the material. For example, if the material is a hard plastic, then in an embodiment of the present invention a particular Region of Interest (ROI) could be 10 millimeters square, and the discrete sampling regions are 100 discrete sampling regions that are each 10 microns square spaced no greater than 50 microns apart in a random manner. However, assume now that the material is ceramic, which has a more uniform roughness (due to manufacturing processes) than hard plastic. As such, for ceramic materials, an ROI for the ceramic material could be 5 millimeters square, and the discrete sampling regions could be only 5 discrete sampling regions that are still 10 microns square but are spaced at least 100 microns apart in a random manner.

In an embodiment of the present invention, one or more processors apply a cutoff filter to the surface micro-roughness measurements of a material in order to remove waviness measurements of the material from the surface micro-roughness measurements of the material (see FIG. 5).

In an embodiment of the present invention, the material is a first material that is designed to be bonded to a second material, and adjusting the mechanical process on the material until micro-roughness measurements for each of the discrete sampling regions are greater than the threshold micro-roughness measurement causes a bonding of the first material to the second material to be stronger than a predetermined minimum level (see FIG. 9). For example, assume that the first material is a fin on a heat sink and the second material is a base of the heat sink. The heat sink and the base of the heat sink are made of a same type of material in one embodiment, and are made of different types of materials in another embodiment. In either embodiment, by adjusting the level of roughness in the micro-roughness areas (more specifically, the minimum Ra area), the overall bonding strength of the two materials is increased.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
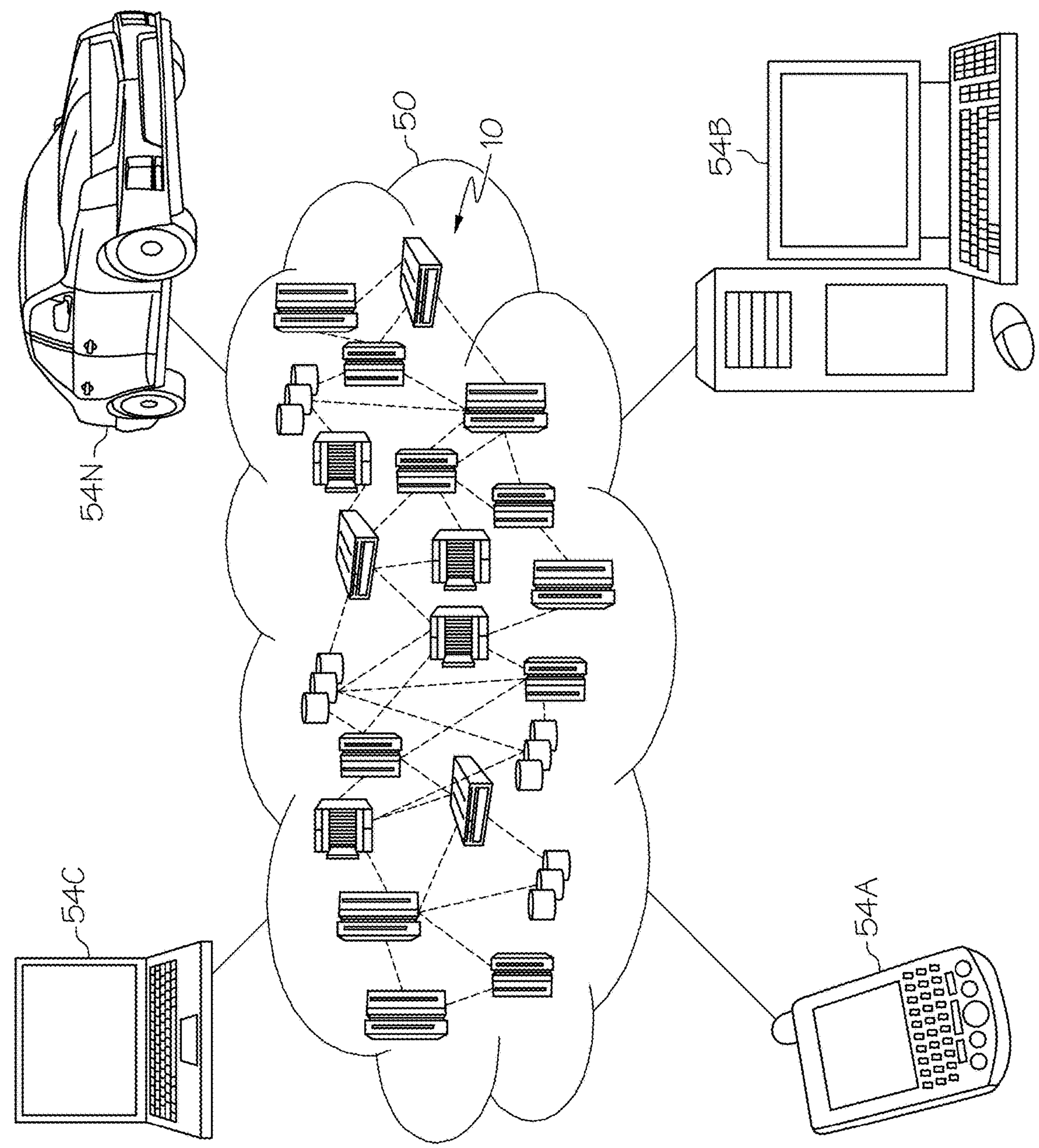
FIG. 11 depicts a cloud computing environment according to an embodiment of the present invention.

Referring now to FIG. 11 illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 11 are intended to be illustrative only and that computing nodes 10 and cloud computing environment 50 can communicate with any type of computerized device over any type of network and/or network addressable connection (e.g., using a web browser).

Figure 12:
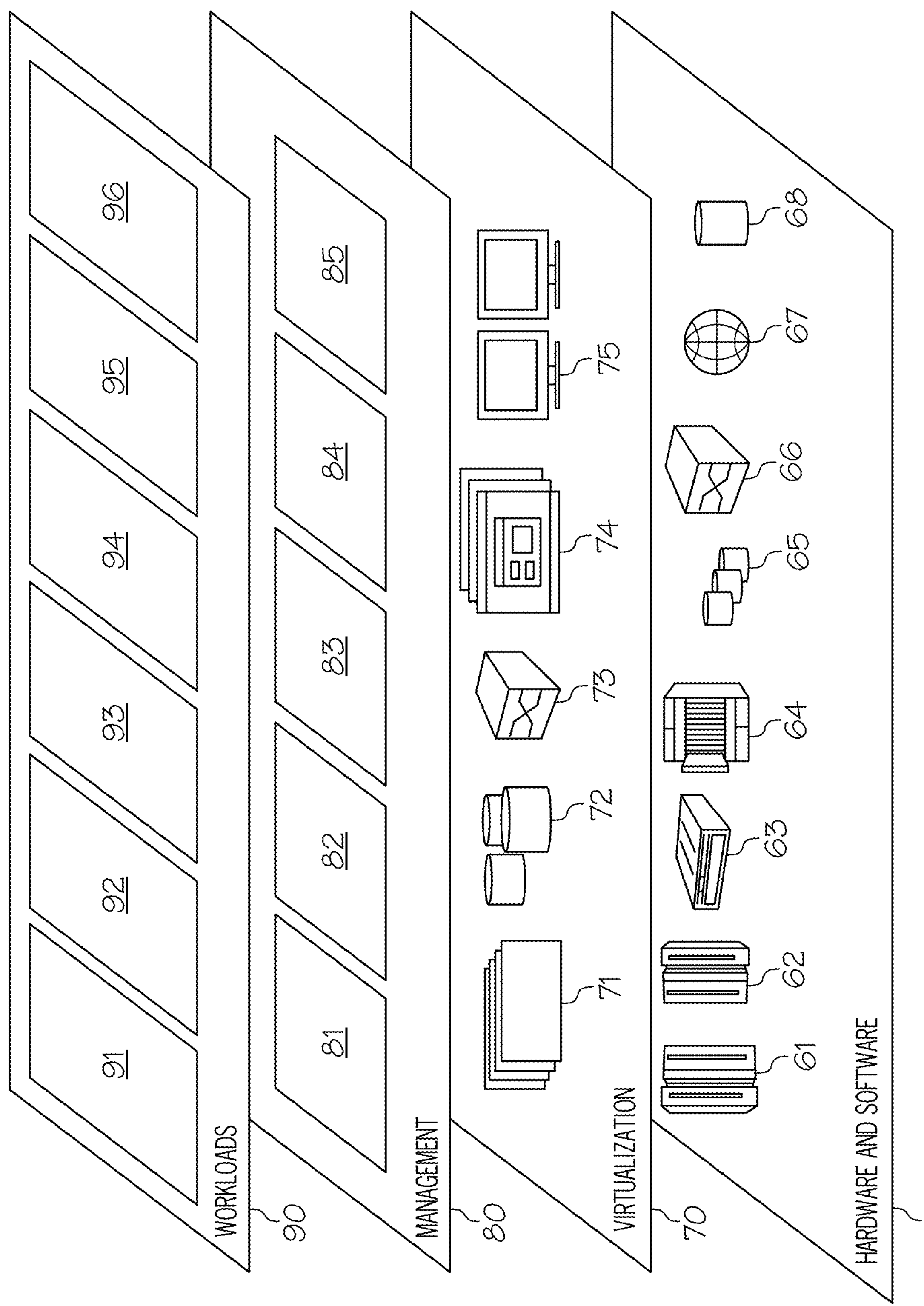
FIG. 12 depicts abstraction model layers of a cloud computer environment according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and material evaluation and modification processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present invention are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:

collecting surface micro-roughness measurements of a material;

defining discrete sampling regions on the material, wherein said defining discrete sampling regions on the material defines defined discrete sampling regions on the material;

placing the discrete sampling regions on the material;

reducing a size of the discrete sampling regions on the material until a particular sampling region having a micro-roughness measurement that is less than the threshold micro-roughness measurement is identified;

defining a size of the defined discrete sampling regions as a size of the particular sampling region that has the micro-roughness measurement that is less than the threshold micro-roughness measurement;

analyzing the surface micro-roughness measurements for each of the discrete sampling regions on the material;

identifying a lowest micro-roughness measurement in a minimum discrete sampling region from the plurality of discrete regions on the material;

comparing the lowest micro-roughness measurement to a threshold micro-roughness measurement;

determining that the lowest micro-roughness measurement is less than the threshold micro-roughness measurement; and in response to determining that the lowest micro-roughness measurement is less than the threshold micro-roughness measurement, adjusting a mechanical process on the material until micro-roughness measurements for each of the discrete sampling regions are greater than the threshold micro-roughness measurement.

2. The method of claim 1, wherein the surface micro-roughness measurements of the material are collected using a magnification between 50× and 150×.

3. The method of claim 1, wherein the threshold micro-roughness measurement is based upon a known failure roughness at which a bond has historically failed due to adhesive separation from the material.

4. The method of claim 1, further comprising:

optimizing a quantity, scatter, spacing, and size of the discrete sampling regions based on compositional characteristics of the material.

5. The method of claim 1, further comprising:

applying, by one or more processors, a cutoff filter to the surface micro-roughness measurements of the material in order to remove waviness measurements of the material from the surface micro-roughness measurements of the material.

6. The method of claim 1, wherein the material is a first material that is designed to be bonded to a second material, and wherein the adjusting the mechanical process on the material until roughness measurements for each of the discrete sampling regions are greater than the threshold micro-roughness measurement causes a bonding of the first material to the second material to be stronger than a predetermined minimum level.

7. The method of claim 1, wherein the material is a first material being bonded to a second material using a bonding material, and wherein the method further comprises:

defining a quantity and position of the discrete sampling regions on the first material based on an analysis of historical data describing the first material being bonded to the second material, a type of bonding material being used, and a failure rate of bonding of the first material to the second material using the type of bonding material, wherein failure rates of bonding for the different types of materials and bonding materials lead to different quantities and positions of the discrete sampling regions being defined.

8. The method of claim 1, wherein the material is a first material, and wherein the method further comprises:

bonding the first material to a second material.

9. The method of claim 8, wherein the first material is a ceramic base on a heat sink, and wherein the second material is a thermal interface material that interfaces between the heat sink and a computer chip.

10. The method of claim 8, wherein the first material a surface that is being prepared for being coated with paint, and wherein the second material is the paint.

11. The method of claim 1, wherein the material is on a surface of a modeled heatsink, and wherein the method further comprises said comparing the lowest micro-roughness measurement to the threshold micro-roughness measurement according to a P(model) mechanical model formula:

$$P(\text{model}) = P(ref) * \frac{L(ref) * A(\text{model})}{L(\text{model}) * A(ref)}$$

wherein:

P(model)=a predicted knock-off strength for a modeled heatsink;

P(ref)=a knock-off strength for a reference heatsink;

L(ref)=a lever arm at a corner of the reference heatsink;

A(model)=a bond area of the modeled heatsink;

A(ref)=a bond area of the reference heatsink; and

L(model)=a lever arm at corner of a modeled heatsink, wherein L(model) is determined by an L(model) formula:

$$L(\text{model}) = \sqrt{H^2 + \sqrt{\left(\frac{L_{HS}}{2} + \Delta L_{HS}\right)^2 + \left(\frac{W_{HS}}{2} + \Delta W_{HS}\right)^2}}$$

wherein:

H=a heatsink height of the modeled heatsink;

$L_{HS}$=a heatsink length of the modeled heatsink;

$\Delta L_{HS}$=a heatsink placement offset in orientation of the $L_{HS}$;

$W_{HS}$=a heatsink width of the modeled heatsink; and $\Delta W_{HS}$=a heatsink placement offset in an orientation of the $W_{HS}$ orientation.

12. The method of claim 1, wherein each of discrete sampling regions on the material is less than 10 microns by 10 microns in size.

13. A computer program product comprising a computer readable storage medium having program code embodied therewith, wherein the computer readable storage medium is not a transitory signal per se, and wherein the program code is readable and executable by a processor to perform a method comprising:

collecting surface micro-roughness measurements of a material;

defining discrete sampling regions on the material;

placing the discrete sampling regions on the material;

analyzing the surface micro-roughness measurements for each of the discrete sampling regions on the material;

identifying a lowest micro-roughness measurement in a discrete sampling region from a plurality of discrete sampling regions on the material by:

evaluating a roughness of each of the plurality of discrete sampling regions based on image of each of the plurality of discrete sampling regions captured by a microscope set at 100×-150 magnification; and identifying which of the plurality of discrete sampling regions has the lowest micro-roughness measurement based on the on an image of each of the plurality of discrete sampling regions captured by a microscope set at 100×-150 magnification;

comparing the lowest micro-roughness measurement to a threshold micro-roughness measurement;

determining that the lowest micro-roughness measurement is less than the threshold micro-roughness measurement; and in response to determining that the lowest micro-roughness measurement is less than the threshold micro-roughness measurement, adjusting a mechanical process on the material until micro-roughness measurements for each of the discrete sampling regions are greater than the threshold micro-roughness measurement.

14. The computer program product of claim 13, wherein the threshold micro-roughness measurement is based upon a known failure roughness at which a bond has historically failed due to adhesive separation from the material.

15. The computer program product of claim 13, wherein the method further comprises:

optimizing a quantity, scatter, spacing, and size of the discrete sampling regions based on compositional characteristics of the material.

16. The computer program product of claim 13, wherein the program instructions are provided as a service in a cloud environment.

17. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

collecting surface micro-roughness measurements of a material, wherein the material is a first material being bonded to a second material using a bonding material;

defining discrete sampling regions on the material;

defining a quantity and position of the discrete sampling regions on the first material based on an analysis of historical data describing the first material being bonded to the second material, a type of bonding material being used, and a failure rate of bonding of the first material to the second material using the type of bonding material, wherein failure rates of bonding for the different types of materials and bonding materials lead to different quantities and positions of the discrete sampling regions being defined;

placing the discrete sampling regions on the material;

analyzing the surface micro-roughness measurements for each of the discrete sampling regions on the material;

identifying a lowest micro-roughness measurement in a discrete sampling region from a plurality of discrete sampling regions on the material;

comparing the lowest micro-roughness measurement to a threshold micro-roughness measurement;

determining that the lowest micro-roughness measurement is less than the threshold micro-roughness measurement; and in response to determining that the lowest micro-roughness measurement is less than the threshold micro-roughness measurement, adjusting a mechanical process on the material until micro-roughness measurements for each of the discrete sampling regions are greater than the threshold micro-roughness measurement.

18. The computer system of claim 17, wherein the program instructions are provided as a service in a cloud environment.

* * * * *